(12) United States Patent
Soliman

(10) Patent No.: US 7,701,911 B2
(45) Date of Patent: Apr. 20, 2010

(54) SYSTEM AND METHOD FOR GLOBAL POWER CONTROL

(75) Inventor: Samir S. Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/388,896

(22) Filed: Feb. 19, 2009

(65) Prior Publication Data

US 2009/0170548 A1 Jul. 2, 2009

Related U.S. Application Data

(62) Division of application No. 11/061,684, filed on Feb. 17, 2005.

(51) Int. Cl.
*H04B 7/216* (2006.01)
(52) U.S. Cl. .................. 370/335; 370/342; 455/522
(58) Field of Classification Search ................ 370/328, 370/335, 342; 455/507, 517, 522
See application file for complete search history.

(56) References Cited

U.S. PATENT DOCUMENTS

| | | | |
|---|---|---|---|
| 5,056,109 A | 10/1991 | Gilhousen et al. ............... 375/1 |
| 5,634,195 A * | 5/1997 | Sawyer ....................... 455/522 |
| 5,799,005 A | 8/1998 | Soliman |
| 5,884,187 A * | 3/1999 | Ziv et al. ..................... 455/522 |
| 6,085,106 A | 7/2000 | Sendonaris et al. ......... 455/522 |
| 6,151,508 A | 11/2000 | Kim et al. |
| 6,463,050 B1 * | 10/2002 | Nagashima ................. 370/347 |
| 6,584,330 B1 * | 6/2003 | Ruuska ....................... 455/574 |
| 6,701,130 B1 * | 3/2004 | Hamalainen et al. ..... 455/67.11 |
| 6,760,566 B1 * | 7/2004 | Wright et al. ............... 455/13.4 |
| 6,856,812 B1 * | 2/2005 | Budka et al. ................. 455/522 |
| 6,879,840 B2 * | 4/2005 | Razavilar et al. ............ 455/522 |
| 6,952,591 B2 * | 10/2005 | Budka et al. ................. 455/517 |
| 7,010,329 B2 * | 3/2006 | Livet et al. ................... 455/574 |
| 7,242,971 B2 * | 7/2007 | Park ........................... 455/574 |
| 7,266,085 B2 * | 9/2007 | Stine .......................... 370/252 |
| 2003/0189906 A1 | 10/2003 | Belcea ........................ 370/318 |
| 2004/0179494 A1 * | 9/2004 | Attar et al. .................. 370/332 |
| 2005/0136965 A1 | 6/2005 | Fourestie et al. ............ 455/522 |
| 2005/0169219 A1 * | 8/2005 | Serpa et al. ................. 370/338 |
| 2006/0135193 A1 * | 6/2006 | Ratasuk et al. .............. 455/522 |

OTHER PUBLICATIONS

International Search Report—PCT/US06/005784, International Search Authority—European Patent Office, Jun. 19, 2006.

(Continued)

*Primary Examiner*—Nhan Le
(74) *Attorney, Agent, or Firm*—Mary A. Pales

(57) ABSTRACT

A system and method are provided for global transmission power control in a wireless communication device. The method comprises: measuring the received power of a receiving device; collecting the received power measurements, and accepting a received power threshold; and, generating the optimal transmit power level for a transmitting device, in response to the collected received power measurements and received power threshold. The received power measurements of base station can be collected and the method generates the optimal transmit power level for a mobile station in response to the collected base station received power measurements. Alternately, the received power for mobile stations in a network downlink can be measured and collected, and the optimal transmit power level for a base station can be calculated in response to the collected mobile station received power measurements.

8 Claims, 10 Drawing Sheets

OTHER PUBLICATIONS

Written Opinion—PCT/US06/005784, International Search Authority—European Patent Office, Jun. 19, 2006.

International Preliminary Report on Patentability—PCT/US06/005784, IPEA—European Patent Office, Jun. 21, 2007.

* cited by examiner

SYSTEM AND METHOD FOR GLOBAL POWER CONTROL

CLAIM OF PRIORITY UNDER 35 U.S.C. §120

The present application for patent is a divisional and claims priority from Utility patent application Ser. No. 11/061,684, filed Feb. 17, 2005, entitled System and Method for Global Power Control, and is assigned to the assignee hereof and hereby expressly incorporated by reference herein.

BACKGROUND OF THE INVENTION

1. Field of the Invention

This invention generally relates to wireless communication systems and, more particularly, to a system and method for globally controlling transmitter power levels in a wireless communications network.

2. Description of the Related Art

In a Code Division Multiple Access (CDMA) cellular telephone system, such as that described in Telecommunications Industry Association (TIA)/Electronic Industries Association (EIA) Interim Standard 95 (IS-95) entitled "Mobile Station-Base Station Compatibility Standard for Dual-Mode Wideband Spread Spectrum Cellular System," a common frequency band is used for communication with all base stations in a system. The common frequency band allows simultaneously communication between a mobile station and more than one base station. Signals occupying the common frequency band are discriminated at the receiving station through the spread spectrum CDMA waveform properties based on the use of a pseudonoise (PN) code. The high-speed PN code is used to modulate signals transmitted from the base stations and the mobile stations. Transmitter stations using different PN codes or PN codes that are offset in time produce signals that can be separately received at the receiving station. The high speed PN modulation also allows the receiving station to receive a signal from a single transmitting station where the signal has traveled over several distinct propagation paths.

The path loss in the CDMA mobile radio channel can be characterized by two separate phenomena: average path loss and fading. The forward link, from the base station to the mobile station, operates on a different frequency than the reverse link, which is directed from the mobile station to the base station. However, because the forward link and reverse link frequencies are within the same frequency band, a significant correlation between the average path loss of the two links exists. On the other hand, fading is an independent phenomenon for the forward link and reverse link and varies as a function of time.

In an exemplary CDMA system, each mobile station estimates the total received power of desired CDMA signals on the assigned CDMA frequency channel of the forward link based on the total received power of all signals in the CDMA bandwidth at the input to the mobile station. The total received power is comprised of the sum of the power of a desired CDMA signal received from the base station presently assigned to the mobile station, and the power of various interfering signals that fall within the CDMA bandwidth. Such interfering signals may be received from other CDMA base stations operating on the frequency assigned to the mobile station, as well as from other nearby communication systems. Since the path loss on the forward and reverse links are assumed to be closely correlated, the mobile station uses the estimate of the forward link power to set the transmit level of the reverse link signal. The transmit level of the reverse link signal is adjusted in order to match the estimated path loss on the reverse link, and arrive at the base station at a predetermined level. Such an open-loop power control system is described in U.S. Pat. No. 5,056,109 entitled "METHOD AND APPARATUS FOR CONTROLLING TRANSMISSION POWER IN A CDMA CELLULAR MOBILE TELEPHONE SYSTEM", assigned to the assignee of the present invention and incorporated herein by reference.

Additionally, the mobile station uses the estimated path loss in determining the power level at which it should transmit access probes, in order to establish communications with the base station on the access channel. The access channel provides communications from the mobile station to the base station when the mobile station is not using a traffic channel (i.e. when a call is not already in progress). Access channel messages provide for call originations, responses to pages, orders, and registrations. Since the access channel in a typical CDMA communication system is a random access channel, multiple mobile stations may simultaneously try to use the access channel. Although the mobile station randomly chooses a PN time alignment to minimize collisions with other mobile stations that are simultaneously transmitting on the access channel, each additional mobile station transmitting on the access channel contributes to the background noise on the channel, which has a finite capacity.

Unfortunately, the presence of interfering signals within the total power received by the mobile station tends to significantly reduce the accuracy of the mobile station's estimate of path loss. When such an inappropriately reduced estimate of path loss is used to set the open-loop transmit level of the reverse link signal, the level may be lower than that necessary to ensure the reverse link signal is received with adequate strength at the base station. Similarly, when an inappropriately reduced estimate of path loss results in an overly favorable indication of channel quality being provided to a user, the user may be unsuccessful at initiating communication over the degraded channel. Additionally, the inaccurate estimate of path loss may lead to the mobile station sending out initially weaker access probes, resulting in multiple unsuccessful attempts to establish communication on the access channel, and therefore unnecessarily wasting some of the access channel capacity and having an adverse effect on the balance of system loading. It should be noted that the above-described problems exist in non-cellular CDMA communication systems as well, such as PCS or wireless local loop systems.

Since mobile stations rely upon the measurement of the wideband total received signal power in estimating path loss to the closest cell-site, interfering signals received from other cell-sites and/or from neighboring cellular systems may result in an inaccurately low path loss estimate. As was previously discussed, this may result in an inadequate level of reverse link signal power being transmitted to the closest cell-site, and an overly favorable indication of channel quality being provided to the mobile station user. This inaccuracy may also result in the mobile station being required to transmit more than one access probe to initiate communication on the access channel. These unnecessary multiple probes clutter the system with undesirable interference that result in performance degradation.

The error in the estimate of the quality of the reverse link introduced by the presence of background interference can be eliminated. A solution to this problem is advanced in U.S. Pat. No. 5,799,005, SYSTEM AN METHOD FOR DETERMINING RECEIVED PILOTPOWER AND PATH LOSS IN A CDMA COMMUNICATION SYSTEM, Samir Soliman, assigned to the same assignee as the instant application. This patent is incorporated herein by reference. Generally, within the communications receiver, a received signal power of the spread-spectrum signal is measured. A relative pilot strength measurement is also made of the pilot signal received with the spread-spectrum signal. The power of the pilot signal is then computed on the basis of the received signal power and the relative pilot strength measurement.

In another aspect, the patent provides a system and method for estimating path loss of a communication channel between a base station and a remote site station. The base station transmits a pilot signal to the remote site station, and also transmits to the remote site station, an indication of the power at which the pilot signal was transmitted. At the remote site station, a total received signal power over the CDMA bandwidth is measured and a relative pilot strength measurement is made of the received pilot signal. The power of the received pilot signal is then computed on the basis of the received signal power and the relative pilot strength measurement. An estimate of the path loss is then made by determining the difference between the indicated power of the transmitted pilot signal, and the received pilot signal power.

The accurate estimation of path loss can be facilitated through determination of the loss experienced by a spread spectrum "pilot" reference signal. In an exemplary CDMA communication system each base station continuously transmits an unmodulated, direct-sequence spread spectrum pilot signal. This pilot signal allows a mobile station to acquire the timing of the forward CDMA channel, provides a phase reference for coherent demodulation by the mobile station, and provides a means for signal strength comparisons between base stations for determining when to handoff. The pilot signal transmitted by each base station in a CDMA system may use the same PN code, but with a different code phase offset, meaning that the PN codes transmitted by neighboring base stations are identical but skewed in time with respect to one another. Phase offset allows the pilot signals to be distinguished from one another according to the base station from which they originate.

The power of the pilot signal received by a given mobile unit from the base station with which the mobile unit is in communication, is determined using a pair of signal measurements made at the mobile unit. In particular, a pilot strength measurement (in dB) is summed with a measurement of the total signal power (in dBm) received by the mobile unit in order to determine the power of the received pilot signal. Specifically:

$$P_{pilot} = E_c/I_0 + P_{total}$$

where Ptotal is the total received signal power (dBm), $E_c/I_0$ is the pilot strength measurement (dB), and Ppilot is the power of the received pilot signal. The term Ec (energy per chip) corresponds to the received pilot signal energy during one chip period, and the term $I_0$ denotes total received spectral power density in the CDMA signal bandwidth. The pilot strength measurement $E_c/I_0$ is thus seen to provide an indication of received pilot signal energy power relative to total received power.

Once the absolute power Ppilot of the received pilot signal has been ascertained, the path loss between the base station and the mobile unit may be determined using an indication of the power at which the pilot signal was transmitted ($P_{transmitted}$ pilot) from the base station. In a conventional CDMA system, in addition to the pilot channel, each cell-site also transmits a setup or "sync" channel. This channel uses the same PN sequence and phase offset as the pilot channel and can be demodulated whenever the pilot channel is being tracked. This sync channel carries, among other things, cell site identification, and the cell site pilot PN carrier phase offset. With this information, the mobile station is capable of establishing system time.

It would be advantageous if the optimum transmitted power levels for link transmitters could be calculated based upon cell-wide, or even more global network considerations.

It would be advantageous to the above-mentioned optimum transmission power levels could be calculated using known received power values, measured at the link receivers.

SUMMARY OF THE INVENTION

Fundamental to the concept of cellular mobile telephony is the process of power control. To achieve higher capacity, CDMA mobile telephone systems employ power control on both up (reverse) and down (forward) links to solve the near-end far-end problem, corner problem, and long and short-term channel variations.

It can be shown that the system capacity is maximized if the transmit power of each wireless user is controlled, so that the signal power at the receiver of the serving base station (Node-B) is the minimum required to achieve a predetermined signal-to-noise ratio (SNR). Hence, the function of each power control loop should be to achieve the minimum SNR per link between a user and serving Node-B, without paying attention to effect this user transmit signal has on other links. This is true if the service is homogenous. That is, if all users enjoy the same quality of service (QoS). This assumption may not be true though, if the service is not homogenous. For example, if users are transmitting/receiving at different data rates or having different QoS. Consider for example a mobile that is sending 384 kbps at the edge of its cell. This mobile has much more impact on the neighboring cell than a similarly situated user who is just making a voice call.

Stated in another way, if the service is homogenous and has the same QoS, then maximizing the link SNR is equivalent to optimizing the capacity of the network. If the network provides non-homogenous services (mixed modes), one must look for a method to globally minimize interference. The present invention global power system provides a more sophisticated means of optimizing network performance that goes beyond concerns for capacity, in recognition that non-homogenous service is increasing more prevalent.

The present invention teaches a system and method that globally controls interference in a CDMA system. The method can also be extended to non-CDMA systems, such as Bluetooth and networks compliant with IEEE 802.11 and 802.15. The objective is to control the maximum transmit power from each wireless user such that the interference level at each base station (Node-B) does not exceed a predetermined threshold. Global power control is important from resource management point of view. On the uplink, the reduction in mobile maximum transmit power can be enabled by reducing data rate, or reducing the base station required SNR. Similarly on the downlink, the base station transmit power can be reduced by adjusting data rates, scheduling, assignment algorithms and QoS parameters.

Accordingly, a method is provided for global transmission power control in a network of wireless communication devices. Generally, the method comprises: measuring the received power of a receiving device; collecting the received power measurements for receiving devices; and, generating the optimal transmit power level, in response to the collected received power measurements.

For example, if the received power of a base station is measured, then the received power measurements for each base station are collected and the method generates the optimal transmit power level for a mobile station in response to the collected base station received power measurements. Alternately, the received power for mobile stations in a network downlink can be measured and collected, and the optimal transmit power level for a base station can be calculated in response to the collected mobile station received power measurements.

More specifically, a received power threshold matrix ($R_{th}$) can be selected for link receiving devices. Then, a matrix ($P_{opt}$) of optimal transmit powers for link transmitting devices can be generated as follows:

$$P_{opt} = L_{inv}[R_{th} - N];$$

where $L_{inv}$ in the inverse of a matrix representing link path loss (L); and where N is a matrix representing the thermal noise of receiving devices.

Additional details of the above-described method, and a global power control system for use in a network of wireless communication devices, are provided below.

DETAILED DESCRIPTION

Figure 1:
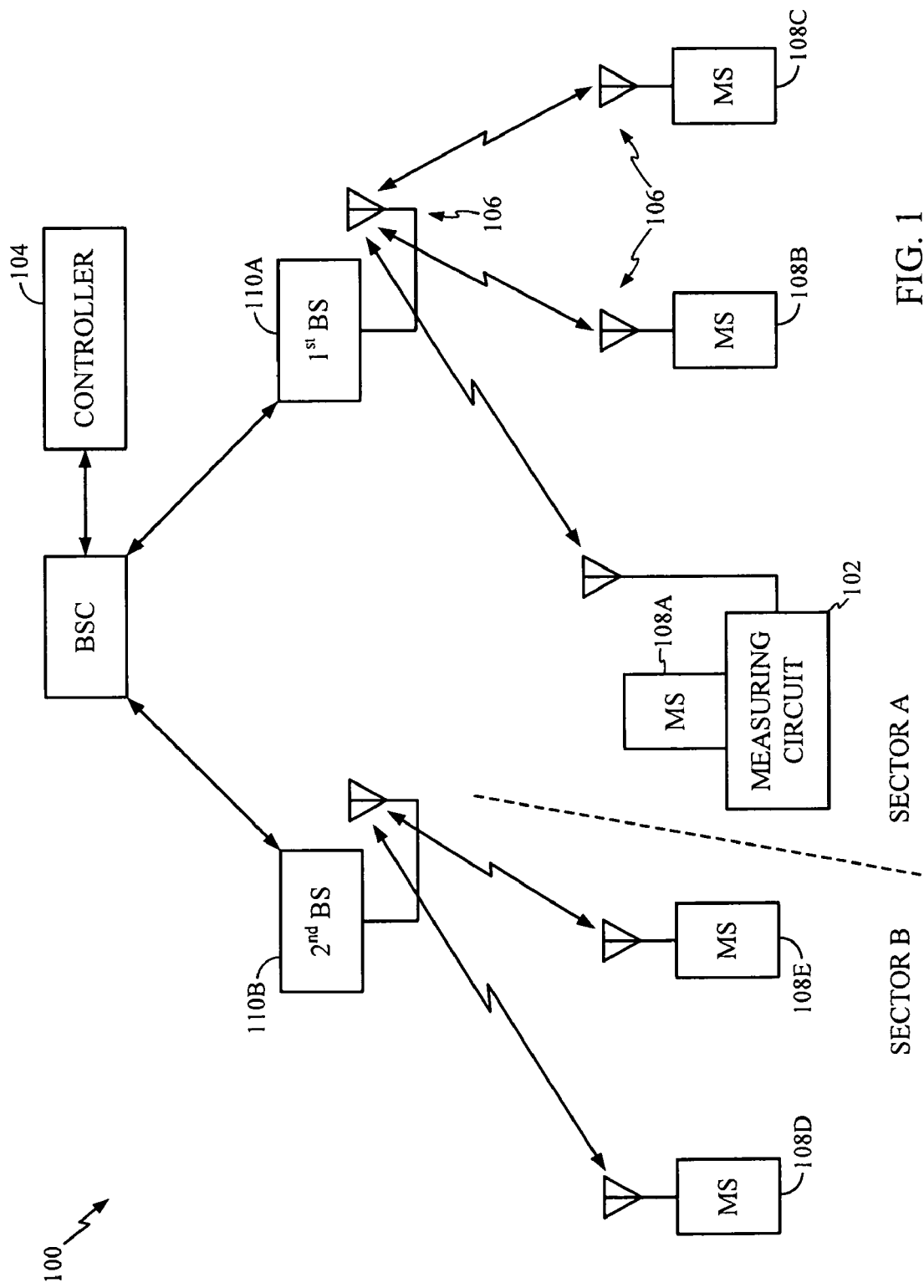
FIG. 1 is a schematic block diagram of a system for global transmission power control in a wireless communication device.

FIG. 1 is a schematic block diagram of a system for global transmission power control in a wireless communication device. The system 100 comprises wireless communications receiving devices. Each receiving device includes an air interface 106, and may also include a measurement circuit 102 for measuring received power. That is, the radio frequency (RF) power within a particular channel or frequency span is measured. This received power measurement includes the transmitted signals of intended communication partners as well as "interference". This interference may include the transmission signals of other devices sharing the channel (frequency span), harmonics and spurious signals generated in other channels, and thermal noise. Note, although only a single measure circuit is shown (embedded with mobile station 108A), a measurement circuit 102 may be embedded with each receiving device in the system.

A controller 104 has an interface connected to the receiving devices for collecting received power measurements and generating optimal transmit power levels for transmitting devices. The system 100 also includes transmitting devices. Each transmitting device has an interface connected to the controller 104 for receiving the optimal transmit power levels. Each transmitting device has an air interface 106 for transmitting to receiving devices using the optimal transmit power. The air interface 106 may be considered to be the combination of an antenna, transceiver, and modulation/demodulation circuitry, but is represented in the figure as simply as antenna.

The definition of "receiving device" and "transmitting device" depends upon the link being used, as each device typically performs both transmitting and receiving functions. To illustrate one aspect of the invention, the system in FIG. 1 can be assumed to be operating in a multiple access telephone network. In uplink (reverse link) communications, from mobile stations 108 to base stations 110, the mobile stations are the transmitting device, and the base stations are the receiving device. Alternately, in downlink (forward link) communications from the base station 110 to the mobile stations 108, the base station is the transmitting device and the mobile station is the receiving device. Note, mobile stations 108 may be considered indirectly interfaced to the controller 104, via the BSs 110, and a base station controller (BSC) 112.

Figure 2:
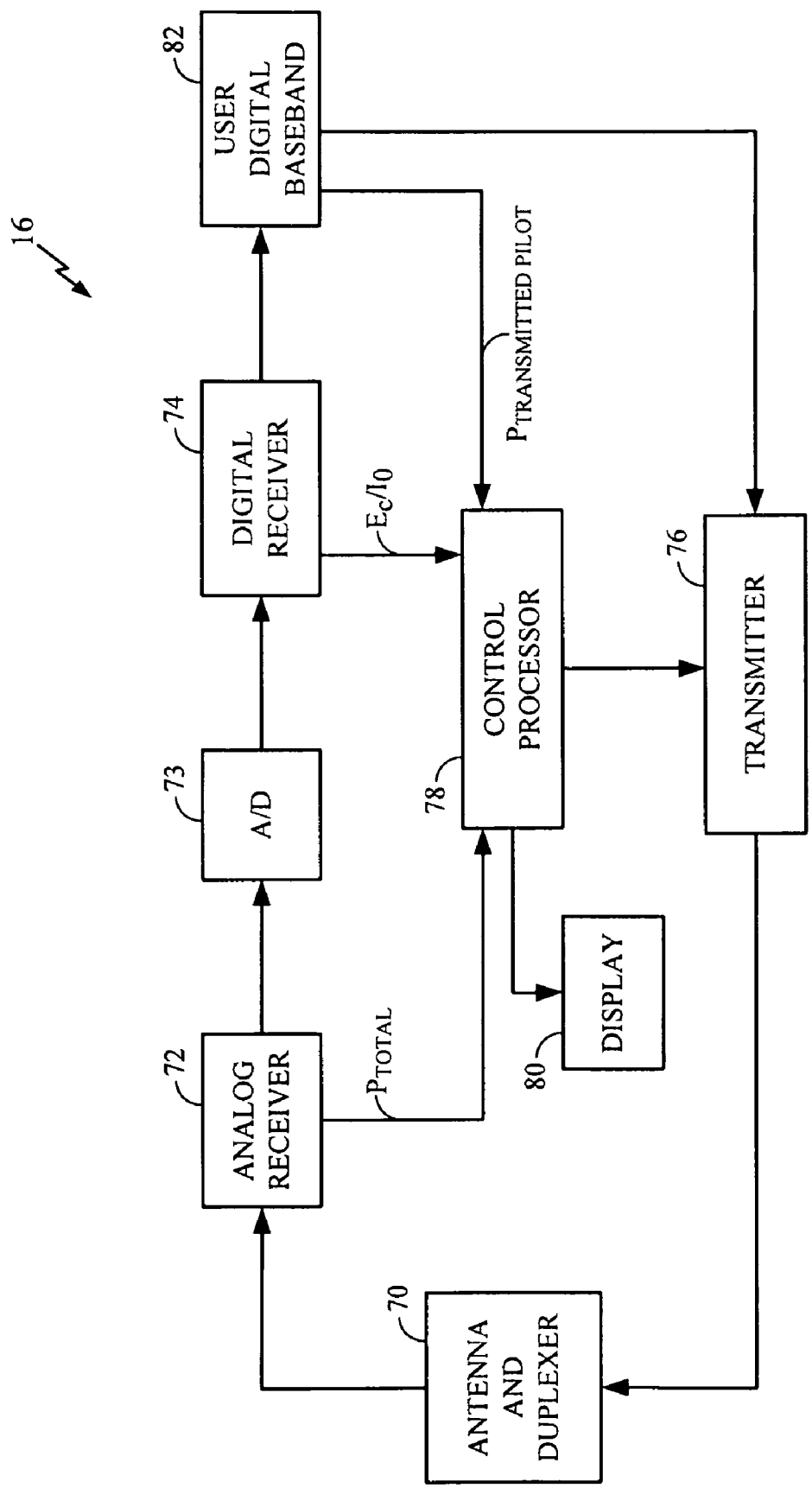
FIG. 2 is block diagram of an exemplary mobile station air interface.

FIG. 2 is block diagram of an exemplary mobile station air interface. This air interface may be assumed to be substantially identical to the other air interfaces in the system. The air interface 106 includes an antenna and duplexer 70 for collecting cell site transmitted signals and radiating mobile unit generated CDMA signals. The mobile station receives the pilot signal, other common channel signals and the traffic signals addressed thereto using antenna and duplexer 70, analog receiver 72 and digital receiver 74. Analog receiver 72 amplifies and frequency down-converts the received RF CDMA signals to IF, and filters the IF signals. The IF signals are output to analog to digital (A/D) converter 73, and the resultant digital data provided to digital receiver 74 for digital processing. As is described below, analog receiver 72 also includes circuitry for performing an analog measurement of the total power of the received signals in the CDMA bandwidth.

Digital data receiver 74 is used for despreading and correlating the received signals addressed to the mobile unit. Digital receiver 74 also separates the digital traffic data from closed loop power adjustment command generated by the cell site. The closed loop power adjustment command data bits are sent to control processor 78. Processor 78 may be a microprocessor as is well known in the art, comprising computation means, memory, and means for generating control signals. Processor 78 generates a transmit power control command that is provided to transmitter 76. Digital receiver 74 also provides data such as digitized encoded speech to user digital baseband circuitry 82 for decoding and interface with the user. Baseband circuitry 82 includes interface hardware for coupling digital receiver 74 and a transmit modulator (not shown) within the transmitter 76. Control processor 78 is also coupled to display 80, and generates a quality indication signal for visual and/or audio indication by display 80 of signal strength to the user. Note, other types of air interface design architectures are known in the art that could enable the present invention system.

Figure 3:
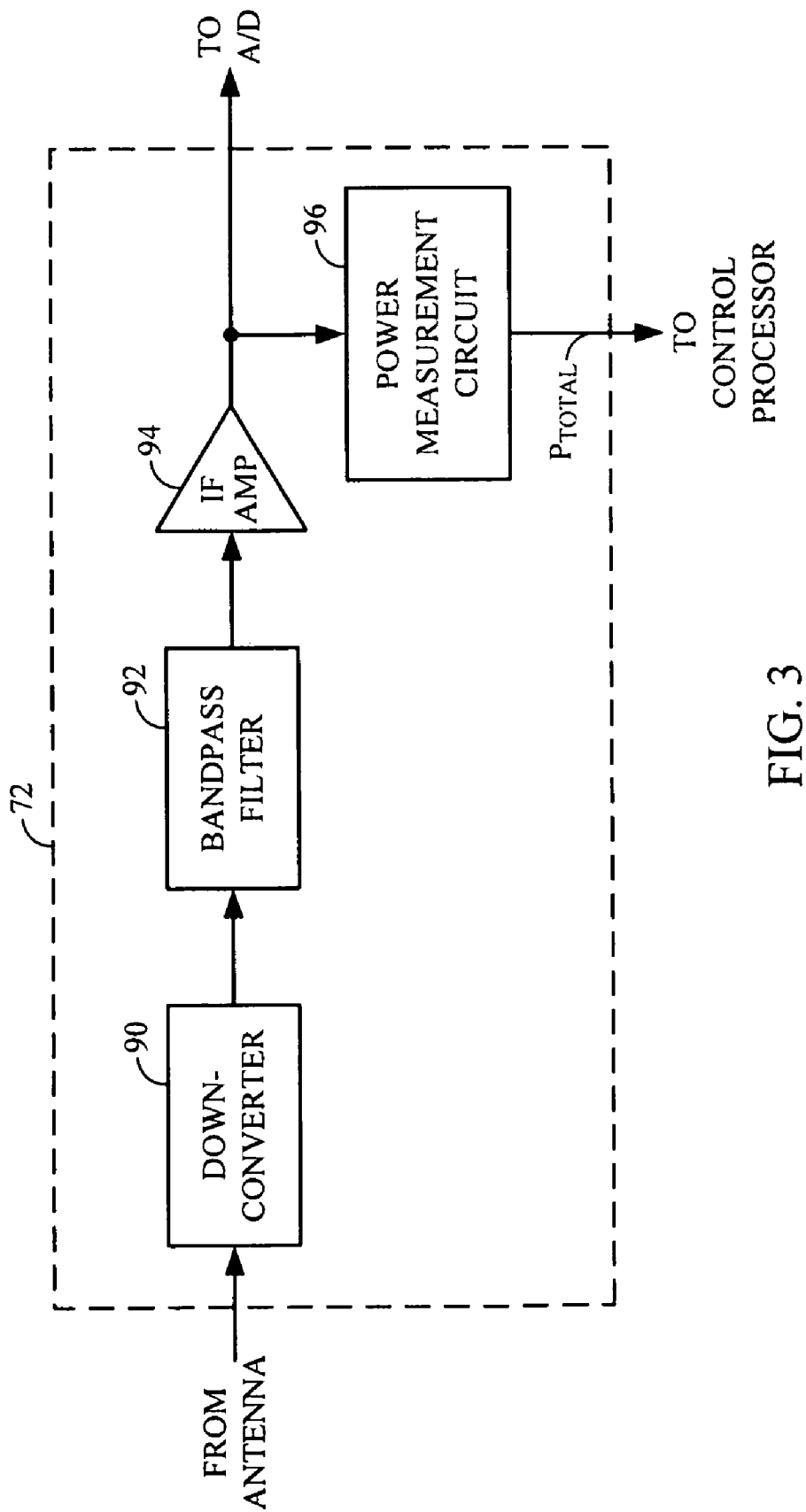
FIG. 3 illustrates in further detail the receiver of FIG. 2.

FIG. 3 illustrates in further detail the receiver 72 of FIG. 2. In FIG. 3, received RF signals from the antenna and duplexer 70 are provided to frequency downconverter 90, where the received RF signals are converted to an IF frequency. The IF frequency signals are coupled to bandpass filter 92, where out-of-band frequency components are removed from the signals.

The filtered signals are output from filter 92 to variable gain IF amplifier 94 where the signals are amplified. The amplified signals are output from amplifier 94 to an analog to digital (A/D) converter (not shown) for subsequent digital signal processing operations on the signals. The output of amplifier 94 is also coupled to power measurement circuit 96. Power measurement circuit 96 generates a received signal strength signal, Ptotal, indicative of the total wideband received signal power. This signal, Ptotal, is provided to control processor 78, where it is used as described below to estimate path loss between the mobile station and a communicating BS.

Returning to FIG. 1, the BSC 112, and other network elements not shown, control the routing of telephone calls from the public switched telephone network (PSTN) to the appropriate cell-site for transmission to the appropriate mobile stations (MSs). The BSC 112 also controls the routing of calls from the mobile station via at least one cell-site to the PSTN. BSC 112 may direct calls between mobile users via the appropriate cell-site stations since such mobile units do not typically communicate directly with one another. BSC 112 may be coupled to BS 110A and 110B by various means such as dedicated telephone lines, optical fiber links, or by radio frequency communications.

In a first aspect of the system the receiving devices are base stations 110, and the controller 104 is associated with a first base station (BS) 110A. As shown, the controller 104 resides with a base station controller (BSC) 112, and the BSC 112 is interfaced to both the first BS 110A, as well as a second BS 110B. However, the controller 104 need not necessarily be located as shown. The controller 104 may reside anywhere within the system 100, and need only be in communication, either directly or indirectly, with the base stations 110. In other aspects not shown, the controller 104 may reside with a particular BS, a plurality of BSs, a particular mobile station, or a plurality of mobile stations.

In this first aspect the transmitting devices are mobile stations 108A, 108B, and 108C being serviced by the first base station 110A (Sector A). Also shown are mobile stations 108D and 108E being serviced by a second BS 110B (Sector B). Likewise, in a second aspect of the system 100, the receiving devices are mobile stations 108 and the transmitting devices are base stations 110 servicing the mobile stations 108.

The controller 104 uses a calculation of the path loss, between link receiving devices and link transmitting devices, and generates the optimal transmit power levels in response to the path loss calculation, among other factors. A system and method for calculating such a path loss have been presented above. Thus, in one aspect the controller 104 may calculate the path loss after collecting the received power measurements from the receiving devices in a particular link. Although this calculation methodology was presented in the context of a CDMA telephone network using pilot signals, it should be recognized that the same principles can be applied to any network protocol that uses pilot signals or generates signals that may be used in a similar manner to calculate path loss. In one aspect of the system, reciprocity is assumed, so that the calculated downlink path losses are used for the uplink path loss.

Alternately, the controller 104 may receive path loss calculations generated by some other unit is the system (not shown), or generated using some other methodology. The system is not limited to any particular calculation means. Therefore, the system is not limited to any particular communication protocol, and is applicable for use in any telephone network, including CDMA and Global System for Mobile communications (GSM) telephone networks.

More specifically, the controller 104 selects or receives a predetermined received power threshold matrix ($R_{th}$), and generates a matrix ($P_{opt}$) of optimal transmit powers for link transmitting devices as follows:

$$P_{opt}=L_{inv}[R_{th}-N];$$

where $L_{inv}$ in the inverse of a matrix representing link path loss (L), and N represents receiver thermal noise. Note, in some aspects a receiver thermal noise number may be assumed, and applied to all power calculations.

With respect to downlink communications, the controller 104 selects a mobile station received power threshold matrix ($Rm_{th}$). The matrix represents the received power levels measured by some, or all of mobile stations 108A, 108B, 108C, 108D, and 108E. The controller 104 generates a matrix ($Pb_{opt}$) of optimal transmit powers for base stations 110A and 110B as follows:

$$Pb_{opt}=L_{dinv}[Rm_{th}-Nm];$$

where $L_{dinv}$ in the inverse of the matrix representing downlink path loss ($L_d$); and where Nm is a matrix representing thermal noise for mobile station receivers.

With respect to uplink communications, the controller 104 selects a base station received power threshold matrix ($Rb_{th}$). For example, the matrix represents the received power levels measured at base stations 110A and 110B. The controller 104 generates a matrix ($Pm_{opt}$) of optimal transmit powers for each mobile station (108A through 108E) as follows:

$$Pm_{opt}=L_{uinv}[Rb_{th}-Nb];$$

where $L_{uinv}$ in the inverse of a matrix representing uplink path loss ($L_u$); and where Nb is a matrix representing thermal noise for base station receivers.

Generally, the system 100 can be operated so that the receiving devices operate at minimum received power levels in response to the transmitting devices transmitting at the optimal transmit power levels. Alternately, in recognition that the system provides non-homogenous services, the controller 104 may act to act to give some communication devices preferential treatment. The controller 104 may compare the optimal transmit power of a transmitting first mobile station 108A to a maximum power threshold and, in response to the comparison, modify the services being provided to mobile station 108A.

For example, the controller 104 may sends instructions transferring the first mobile station 108A from service by the first base station 110A, to service by the second base station 110B, in a sector adjoining the first base station 110A, in response to power threshold comparison. This may be the case if it is determined that the first mobile station 108A is interfering with another mobile station having a higher QoS. Alternately, the controller 104 may send instructions for denying first base station service to the first mobile station 108A in response to the comparison.

It should be understood that the above-mentioned system 100 can used for only uplink global power control, only downlink power control, or for power control in both the uplink and downlink paths. It should also be understood optimal transmit power calculations can be performed without using every possible received power measurement. That is, some of the matrix variables can be set to zero, to speed calculations, in recognition that their contribution is trivial. Likewise, the system can be enabled with only a portion of the receiving devices reporting received power measurements.

Figure 4:
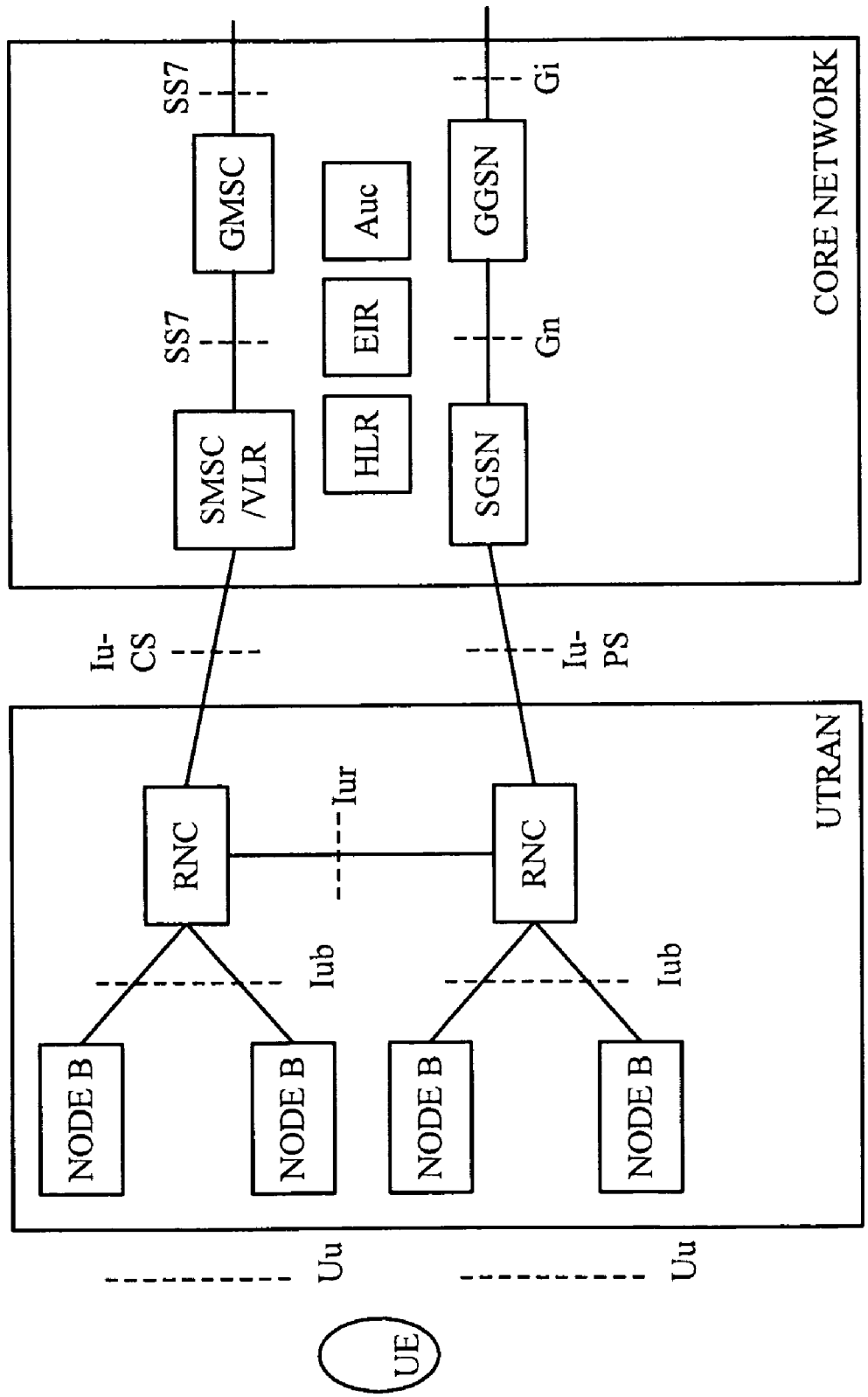
FIG. 4 is a schematic block diagram of Universal Mobile Telecommunications System (UMTS) network architecture.

FIG. 4 is a schematic block diagram of Universal Mobile Telecommunications System (UMTS) network architecture. UMTS is a third-generation cellular network protocol, evolved from GSM, incorporating CDMA transmission technology. UMTS consists of three interacting domains; Core Network (CN), UMTS Terrestrial Radio Access Network (UTRAN), and User Equipment (UE). The main function of the core network is to provide switching, routing and transit for user traffic. Core network also contains the databases and network management functions.

The basic Core Network architecture for UMTS is based on GSM network with General Packet Radio Service (GPRS). All equipment has to be modified for UMTS operation and services. The UTRAN (UMTS Terrestrial Radio Access Network) provides the air interface access method for User Equipment. A Base Station is referred to as Node-B and control equipment for Node-B's is called Radio Network Controller (RNC). It is necessary for a network to know the approximate location of UE in order to page. Below is the list of system areas from largest to smallest:
  UMTS systems (including satellite)
  Public Land Mobile Network (PLMN)
  MSC/VLR or SGSN
  Location Area
  Routing Area (PS domain)
  UTRAN Registration Area (PS domain)
  Cell
  Sub cell.

UMTS offers teleservices (like speech or SMS) and bearer services, which provide the capability for information transfer between access points. It is possible to negotiate and renegotiate the characteristics of a bearer service at session or connection establishment and during ongoing session or connection. Both connection-oriented and connectionless services are offered for Point-to-Point and Point-to-Multipoint communication.

Bearer services have different QoS parameters for maximum transfer delay, delay variation, and bit error rate. Offered data rate targets are:
  144 kbits/s satellite and rural outdoor
  384 kbits/s urban outdoor
  2048 kbits/s indoor and low range outdoor.

UMTS network services have different QoS classes for four types of traffic:
  Conversational class (voice, video telephony, video gaming)
  Streaming class (multimedia, video on demand, webcast)
  Interactive class (web browsing, network gaming, database access)
  Background class (email, SMS, downloading).

In the context of a CDMA telephone network operating in the uplink path, which is understood to include 3G GSM (UMTS) networks, the base stations 110 (receiving devices) are typically referred to as Node-B devices, the mobile stations 108 (transmitting devices) are referred to as User Equipment (UE) devices, and the BSC is referred to as an RCN, as explained in more detail below. In the downlink path, the UEs 108 are the receiving devices and the Node-B devices 108 are the transmitting devices.

Figure 5:
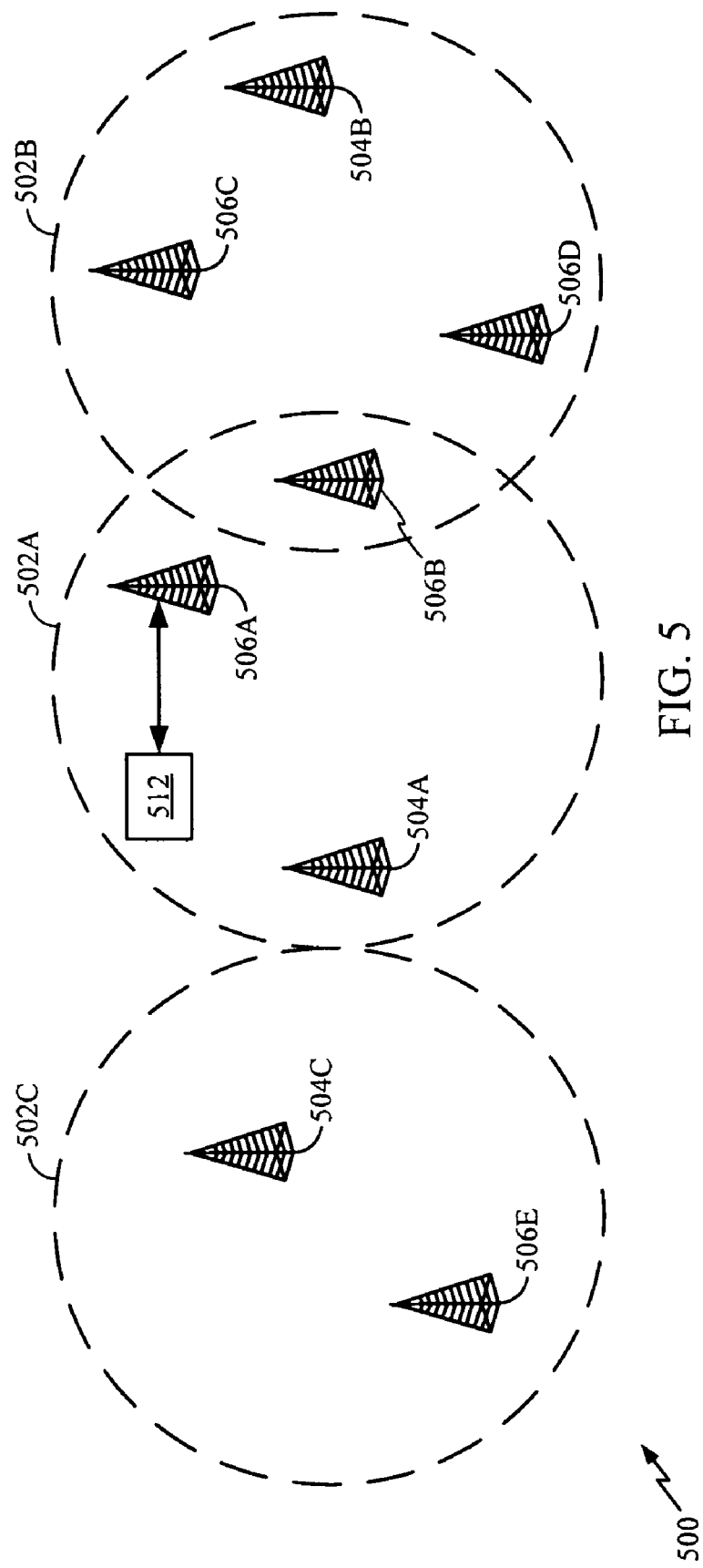
FIG. 5 is a schematic block diagram of an ad-hoc network.

FIG. 5 is a schematic block diagram of an ad-hoc network. Examples of ad-hoc networks include Bluetooth or Wireless Personal Area Network (WPAN) networks generally compliant with IEEE 802.15, such as Ultra-Wideband (UWB) networks. Both Bluetooth and UWB networks share the characteristics of being low power networks, and are envisioned for use in a "personal space", such as an office, room, or car. Other networks such as IEEE 802.11 Wireless Local Area Networks (WLANs) may also be configured ad-hoc or as infrastructure networks. Compared to IEEE 805.15 or Bluetooth networks, 802.11 networks operate at larger power levels and are intended to cover larger geographical areas. It should be understood that the global power control invention has application any type of ad-hoc network. Although the discussion below focuses upon ad-hoc networks, it also applies to infrastructure networks, where terminal roles and locations are predefined or constant.

The wireless communication networks of FIGS. 1 and 4 are access networks implemented with multiple fixed site base stations dispersed throughout a geographic region, subdivided into smaller regions known as cells. Each base station may be configured to serve the mobile stations in its respective cell.

In contrast to the conventional access network, ad-hoc networks are dynamic. An ad-hoc network may be formed when a number of wireless communication devices, often referred to as terminals join together to form a network. Terminals in ad-hoc networks can operate as either a host or router. Thus, an ad-hoc network may be easily reconfigured to meet existing traffic demands in a more efficient fashion. Without assigned network roles, established up/down links, and associated inner/outer loop power control procedures, the application of present invention global power control system is critical to ad-hoc networks.

An exemplary network 500 comprises at least one piconet 502. As used herein, a "piconet" is a collection of communication devices or terminals connected using wireless technology in an ad-hoc fashion. The terminals may be stationary or in motion. The term "terminal" is intended to encompass various types of communications devices including cellular, PCS, wireless or landline phones, personal data assistants (PDA), laptops, external or internal modems, PC cards, and other similar devices. The various terminals may communicate with each other using any conventional modulation format. In the interest of brevity, the above-mentioned terminology is intended to generally apply to the discussion of all network types.

A piconet may be formed in a variety of ways. By way of example, when a terminal initially powers up, it may search for pilot signals from piconet master terminals. The pilot signal broadcast by each piconet master terminal may be an unmodulated spread-spectrum signal, or some other reference signal. In spread-spectrum configurations, a pseudorandom noise (PN) code unique to each piconet master terminal may be used to spread the pilot signal. Using a correlation process, the terminal may search through possible PN codes to identify the master terminal with the strongest pilot signal. If the strongest pilot signal is received with sufficient signal strength to support a minimum data rate, then the terminal may attempt to join the piconet by registering with the master terminal.

A terminal may be unable to find a pilot signal because there is no master terminal. In some instances, a terminal may be unable to find a pilot signal of sufficient signal strength to support the minimum data rate. This may result from any number of reasons. By way of example, the terminal may be too far from the master terminal. Alternatively, the propagation environment may be insufficient to support the requisite data rate. In either case, the terminal may be unable to join an existing piconet, and therefore, may begin operating as an isolated terminal by transmitting its own pilot signal. The isolated terminal may become the master terminal for a new piconet. Other terminals that are able to receive the pilot signal broadcast from the isolated terminal with sufficient strength may attempt to acquire that pilot signal and join the piconet of this isolated terminal.

Figure 6:
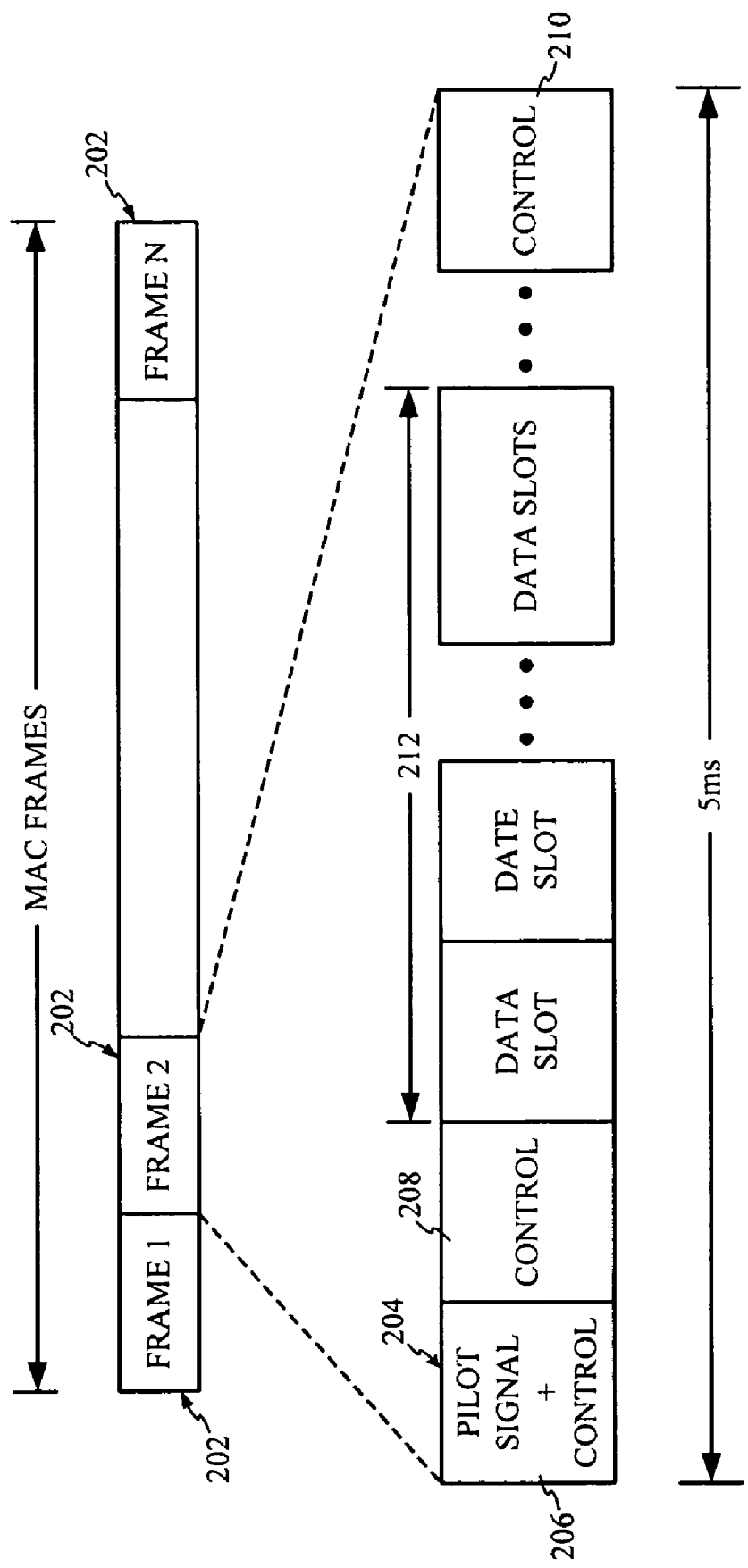
FIG. 6 is a conceptual diagram illustrating an example of a Medium Access Control (MAC) frame for controlling intra-piconet communications.

FIG. 6 is a conceptual diagram illustrating an example of a Medium Access Control (MAC) frame for controlling intra-piconet communications. The master terminal may be responsible for scheduling intra-piconet communications. This may be accomplished through the use of one or more additional spread-spectrum control channels that occupy various time slots within the frame, such as time slots 208 and 210. These additional control channels may be broadcast by the master terminal to all the member terminals and include various scheduling information. The scheduling information may include time slot assignments for communications between terminals within the piconet. As shown, these time slots may be selected from the data slots portion 212 of the frame 202. Additional information, such as the power level and data rate for each communication between terminals, may also be included. The master terminal may also grant transmit opportunities in any given time slot to any number of terminal pairs using a CDMA scheme. In this case, the scheduling information may also assign the spreading codes to be used for the individual communications between terminals. Pilot signals may also be assigned particular time slots.

Figure 7:
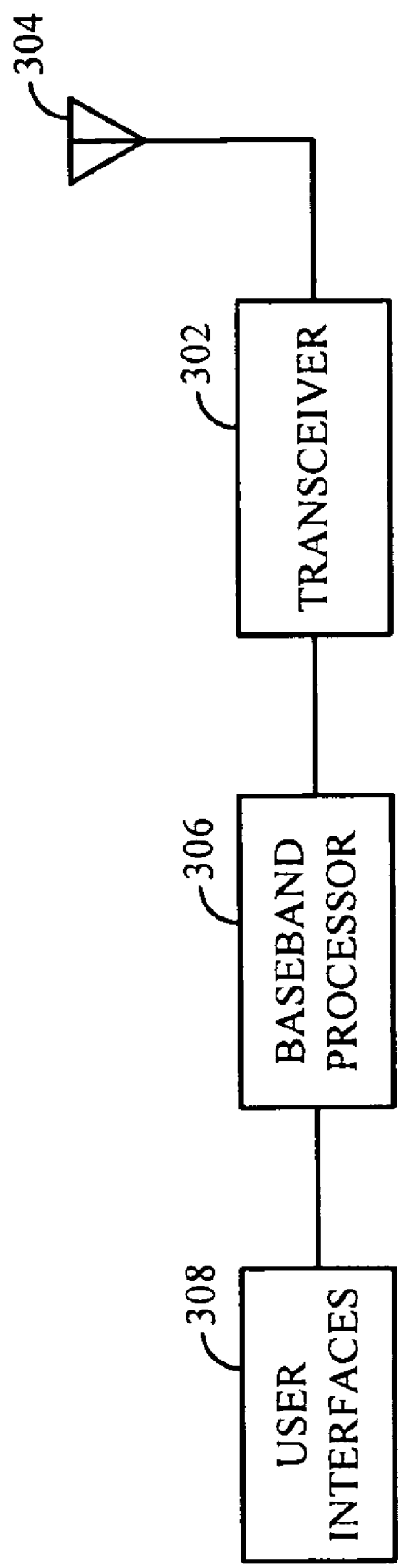
FIG. 7 is a conceptual block diagram illustrating one possible configuration of a terminal.

FIG. 7 is a conceptual block diagram illustrating one possible configuration of a terminal. As those skilled in the art will appreciate, the precise configuration of the terminal may vary depending on the specific application and the overall design constraints. The terminal may be implemented with a front-end transceiver 302 coupled to an antenna 304. A baseband processor 306 may be coupled to the transceiver 302. The baseband processor 306 may be implemented with a software based architecture, or any other type of architecture. A microprocessor may be used as a platform to run software programs that, among other things, provide executive control and overall system management functions that allow the terminal to operate either as a master or member terminal in a piconet. A digital signal processor (DSP) may be implemented with an embedded communications software layer that runs application-specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

Piconet 502a includes a master terminal 504a and at least one slave terminal 506. Shown are slaves 506a and 506b. The master 504a may communicate to the slaves 506a and 506b using any conventional multiple access scheme such as CDMA, Time Division Multiple Access (TDMA), or Frequency Division Multiple Access (FDMA). Power control becomes an important issue when two piconets are proximately located, as the communications in one piconet may be seen as interference in another piconet. Shown is a second piconet 502b with master 504b and, slaves 506c and 506d. In some aspects as shown, a terminal may be a member of both piconets. In Bluetooth terminology, such an arrangement is called a scatternet. As shown, slave 506b is a member of both piconets 502a and 502b. Alternately, a third piconet 502c, with master 504a and slave 506e, is shown proximate to piconet 502a.

The application of the present invention power control system to the ad-hoc network 500 can be understood as similar to the CDMA network of FIG. 1, with the slave terminals 506 being equivalent to the MSs of FIG. 1, and the master terminals 502 being equivalent to the BSs. The controller 512, equivalent to the controller in FIG. 1, is shown embedded with master 502a. The controller derives the optimal transmit power levels for the transmitting slave terminal link, as well as the transmitting master terminal links. In some aspects, any of the devices may be qualified to perform the controller function, and the site of the controller 512 is selected on an ad-hoc basis. Alternately, a subset of the devices may be qualified to perform the controller function, based upon hardware, memory, processor speed, and power consumption limitations. Wherever embedded, the controller 512 derives the optimal transmit power levels using the same algorithms as presented above in the explanation of FIG. 1, which are not repeated here in the interest of brevity.

As described above, ad-hoc networks may also use pilot signals, in which case the path loss calculations can be made using the same methodology as the CDMA network of FIG. 1. However as noted earlier, the global power control system is not dependent upon any particular method of calculating path loss.

Functional Description

CDMA is an interference-limited system in the sense that the system capacity (number of simultaneous calls) is determined by the amount of interference the system can tolerate. On the uplink, the amount of interference depends on the received signal level from each user within or outside the cell. The output power of wireless units must be controlled so as to guarantee that enough signal strength received at the base station to maintain good signal quality. Similarly, on the downlink the amount of interference depends on the power from different Node-Bs (BSs) and their loadings.

Although the following analysis is explained in the context of a UMTS network, it is applicable to any of the above-mentioned networks that uses a modulation protocol that shares communication channels, such as direct sequence (DS) spread spectrum, Orthogonal Frequency Division Multiplexing (OFDM), and even avoidance type spread spectrum systems, such as frequency-hopping and time-hopping.

Uplink Scenario

Suppose that there are M wireless users (UEs) and K Node-Bs. The received power at Node i is $$Rb_i = Nb_i + \sum_{j=1}^{M} Pm_j L_{ji}, \quad i = 1, \ldots, K \quad (1)$$

where $Nb_i$ is the thermal noise, $P_j$ is the jth UE transmit power and $L_{ji}$ is the path loss between jth UE and ith Node.

This set of linear equations can be written in the following matrix form $$Rb = Nb + L * Pm \quad (2)$$

where, $$Rb = \begin{bmatrix} Rb_1 \\ Rb_2 \\ \ldots \\ Rb_K \end{bmatrix}$$

$$Nb = \begin{bmatrix} Nb_1 \\ Nb_2 \\ \ldots \\ Nb_K \end{bmatrix}$$

$$L = \begin{bmatrix} L_{11} & L_{12} & \ldots & L_{1M} \\ L_{21} & L_{22} & \ldots & L_{2M} \\ \ldots & \ldots & \ldots & \ldots \\ L_{K1} & L_{K2} & \ldots & L_{KM} \end{bmatrix}$$

-continued $$P = \begin{bmatrix} Pm_1 \\ Pm_2 \\ \ldots \\ Pm_M \end{bmatrix}$$

The objective is to solve for a set of UE transmit powers such that the Node-B received power vector $Rb \leq Rb_{th}$. This problem can be solved using linear programming. In the case where M=K, the system of linear equations produces the following solution:

$$Pm_{opt} = L_{inv}[Rb_{th} - Nb] \quad (3)$$

where $L_{inv}$ is the inverse of the path loss matrix.

Hence, in order to manage the global received power (interference), the serving and drifting RNC must use the outer loop power control of each link in such a way that Equation (3) is justified. In UMTS the path loss of each user uplink is measured by the UE. This information can be sent back to the RNC in order to calculate the inverse path loss matrix.

Downlink Scenario

The received power at jth UE is $$Rm_j = Nm_j + \sum_{i=1}^{K} Pb_j L_{ij}, \quad j=1, \ldots, M \quad (4)$$

where $Nm_j$ is the jth UE thermal noise, $Pb_i$ is the ith Node-B transmit power and $L_{ij}$ is the path loss between ith UE and jth Node.

This set of linear equations can be written in the following matrix form $$Rm = Nm + L * Pb \quad (5)$$

where, $$Rm = \begin{bmatrix} Rm_1 \\ Rm_2 \\ \ldots \\ Rm_M \end{bmatrix}$$

$$Nm = \begin{bmatrix} Nm_1 \\ Nm_2 \\ \ldots \\ Nm_M \end{bmatrix}$$

$$L = \begin{bmatrix} L_{11} & L_{12} & \ldots & L_{1K} \\ L_{21} & L_{22} & \ldots & L_{2M} \\ \ldots & \ldots & \ldots & \ldots \\ L_{M1} & L_{M2} & \ldots & L_{MK} \end{bmatrix}$$

$$Pb = \begin{bmatrix} Pb_1 \\ Pb_2 \\ \ldots \\ Pb_K \end{bmatrix}$$

The objective is to solve for a set of mobile transmit powers such that the received power vector $Rm \leq Rm_{th}$. This problem can be solved using linear programming. In the case where M=K, the system of linear equations produces the following solution:

The solution is $$Pb_{opt} = L_{inv}[Rm - Nm] \quad (6)$$

where $L_{inv}$ is the inverse of the path loss matrix.

That is, in order to manage the global received power (interference) the serving and drifting RNC must use the outer loop power control of each user downlink in such a way that Equation (3) is justified. In UMTS the path loss of each link is measured by the UE. This information can be sent back to the RNC in order to calculate the inverse path loss matrix.

Figure 8:
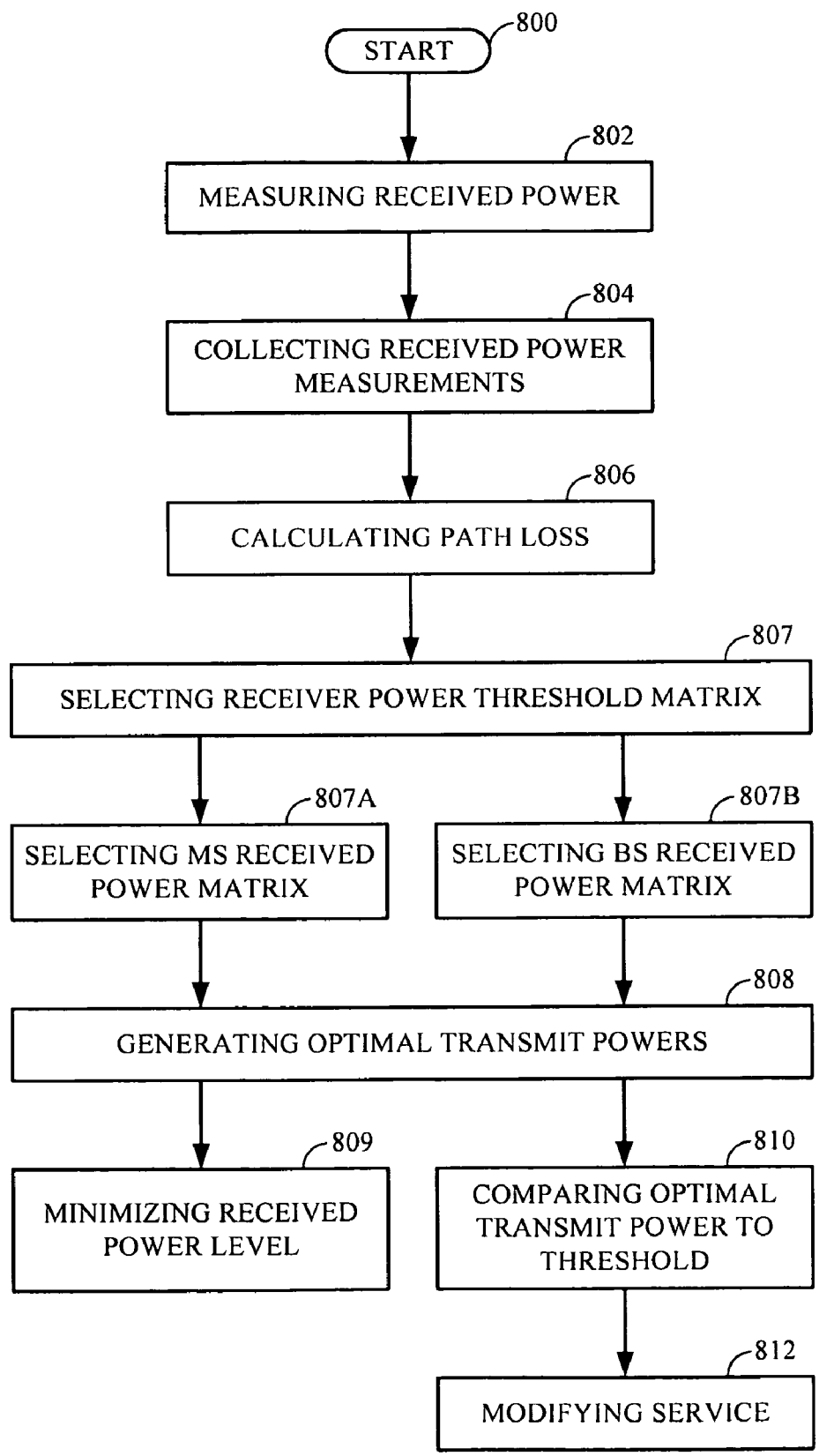
FIG. 8 is a flowchart illustrating a method for global transmission power control in a wireless communication device.

FIG. 8 is a flowchart illustrating a method for global transmission power control in a wireless communication device. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. Details of the method can also be understood in the context of the explanations of FIGS. 1 through 7, above. The method starts at Step 800.

Step 802 measures the received power of a wireless communications receiving device. Although the method is generally described using telephone terminology, Step 802 may be performed in CDMA telephone, GSM telephone, IEEE 802.11x wireless networks, in telephone networks, such as UMTS, which incorporate a CDMA physical layer, as well as in UWB and ad-hoc networks, such as described by IEEE 802.15, and Bluetooth networks. Step 804 collects the received power measurements for receiving devices, and accepts a received power threshold set of values. Step 806 calculates the path loss between receiving devices and transmitting devices. Step 808 generates the optimal transmit power level for a transmitting device, in response to the collected received power measurements and received power threshold. In one variation a further step, Step 809, minimizes the received power level to receiving devices in response to generating the optimal transmit power level for the transmitting device. That is, the overall interference level in a frequency band is minimized as a response to using the generated optimum power levels.

In one aspect, measuring the received power of the receiving device in Step 802 includes measuring the received power of a base station in a network uplink. Then, Step 804 collects the received power measurements for each base station, and Step 808 generates the optimal transmit power level for a mobile station in response to the collected base station received power measurements.

In another aspect, measuring the received power of the receiving device in Step 802 includes measuring the received power for a mobile station in a network downlink. Then, Step 804 collects the received power measurements for each mobile station, and Step 808 generates the optimal transmit power level for a base station in response to the collected mobile station received power measurements.

In one aspect, Step 807 selects a received power threshold matrix ($R_{th}$) for link receiving devices. Then, generating the optimal transmit power level of the link transmitting device in Step 808 includes generating a matrix ($P_{opt}$) of optimal transmit powers for link transmitting devices as follows:

$$P_{opt} = L_{inv}[R_{th} - N];$$

where $L_{inv}$ in the inverse of a matrix representing link path loss (L); and where N is a matrix representing the thermal noise of receiving devices.

In another aspect, Step 807b selects a mobile station received power threshold matrix ($Rm_{th}$). Then, Step 808 generates a matrix ($Pb_{opt}$) of optimal transmit powers for base stations as follows:

$$Pb_{opt}=L_{dinv}[Rm_{th}-Nm];$$

where $L_{dinv}$ in the inverse of a matrix representing downlink path loss (Ld); and where Nm is a matrix representing thermal noise of mobile station receivers.

Alternately, Step 807b selects a base station received power threshold matrix ($Rb_{th}$). Then, Step 808 generates a matrix ($Pm_{opt}$) of optimal transmit powers for mobile stations as follows:

$$Pm_{opt}=L_{dinv}[Rb_{th}-Nb];$$

where $L_{uinv}$ in the inverse of a matrix representing uplink path loss (Lu); and where Nb is a matrix representing thermal noise for base station receivers.

In a different aspect of the method, Step 810 compares the optimal transmit power of a transmitting first mobile station to a maximum power threshold. Then, Step 812 transfers the first mobile station from service by a first base station, to service by a second base station, in a sector adjoining the first base station, in response to the comparison. Alternately, Step 812 may deny first base station service to the first mobile station in response to the comparison. The comparison process of Step 810 infers that an operation occurs that evaluates the impact of the first mobile station on the system as a whole. Then, in Step 812, a decision is made, regarding switching service or denying service, based on some interference criterion/metric. That is, the decision may involve computing two different scenarios to see which scenario is best from the total interference point of view.

Figure 9:
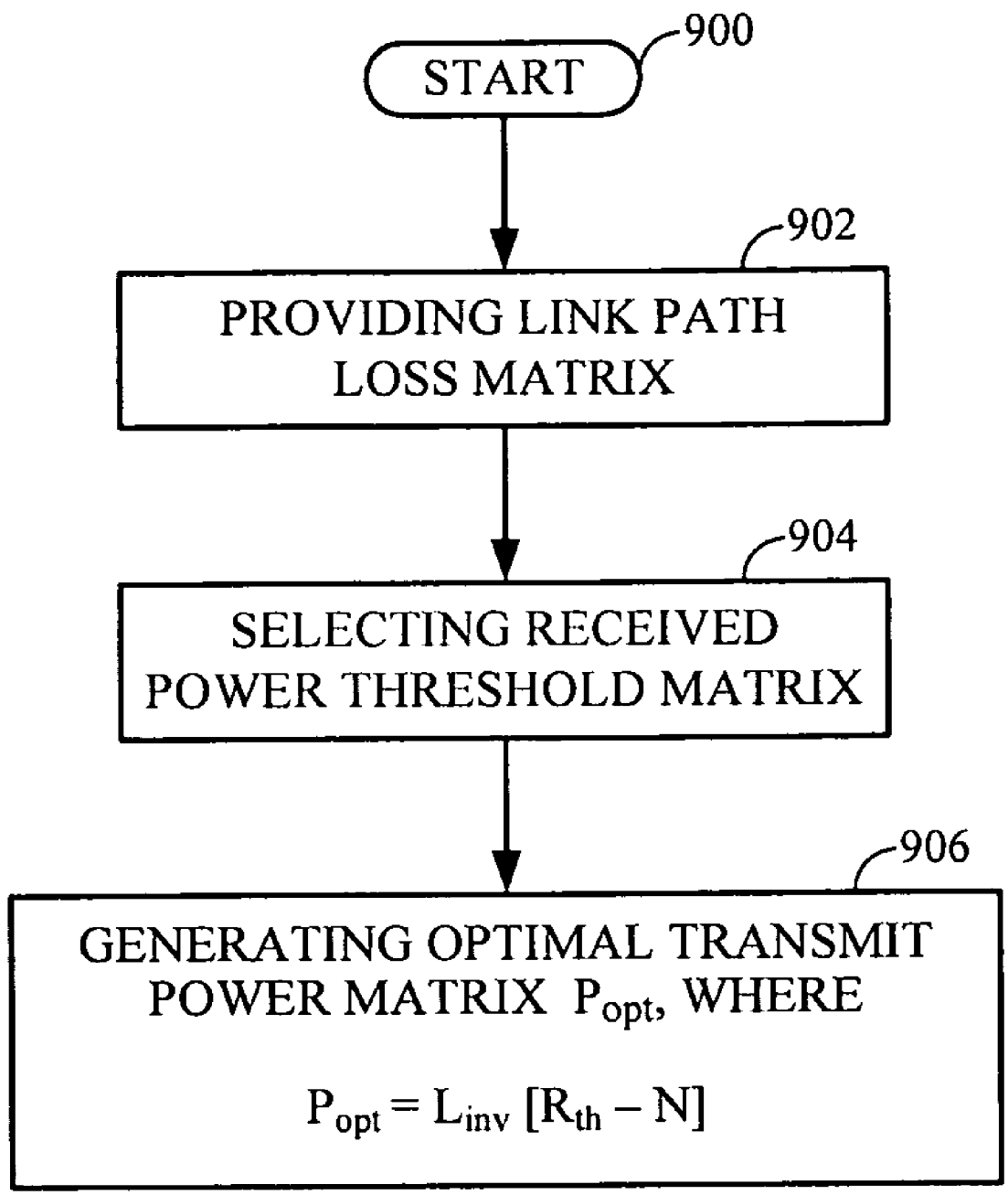
FIG. 9 is a flowchart illustrating a method for global uplink power control in a CDMA telephone network.

FIG. 9 is a flowchart illustrating a method for global uplink power control in a CDMA telephone network. The method starts at Step 900. Step 902 provides an uplink path loss matrix ($L_u$) between UE and Node-B devices. Step 904 selects a Node-B received power threshold matrix ($Rb_{th}$). Step 906 generates a matrix ($Pm_{opt}$) of optimal transmit powers for UEs as follows:

$$Pm_{opt}=L_{uinv}[Rb_{th}-Nb].$$

With respect to the downlink, Step 902 provides a downlink path loss matrix ($L_d$) between Node-B and UE devices. Step 904 selects a UE received power threshold matrix ($Rm_{th}$), and Step 906 generates a matrix ($Pb_{opt}$) of optimal transmit powers for Node-Bs as follows:

$$Pb_{opt}=L_{dinv}[Rm_{th}-Nm].$$

Figure 10:
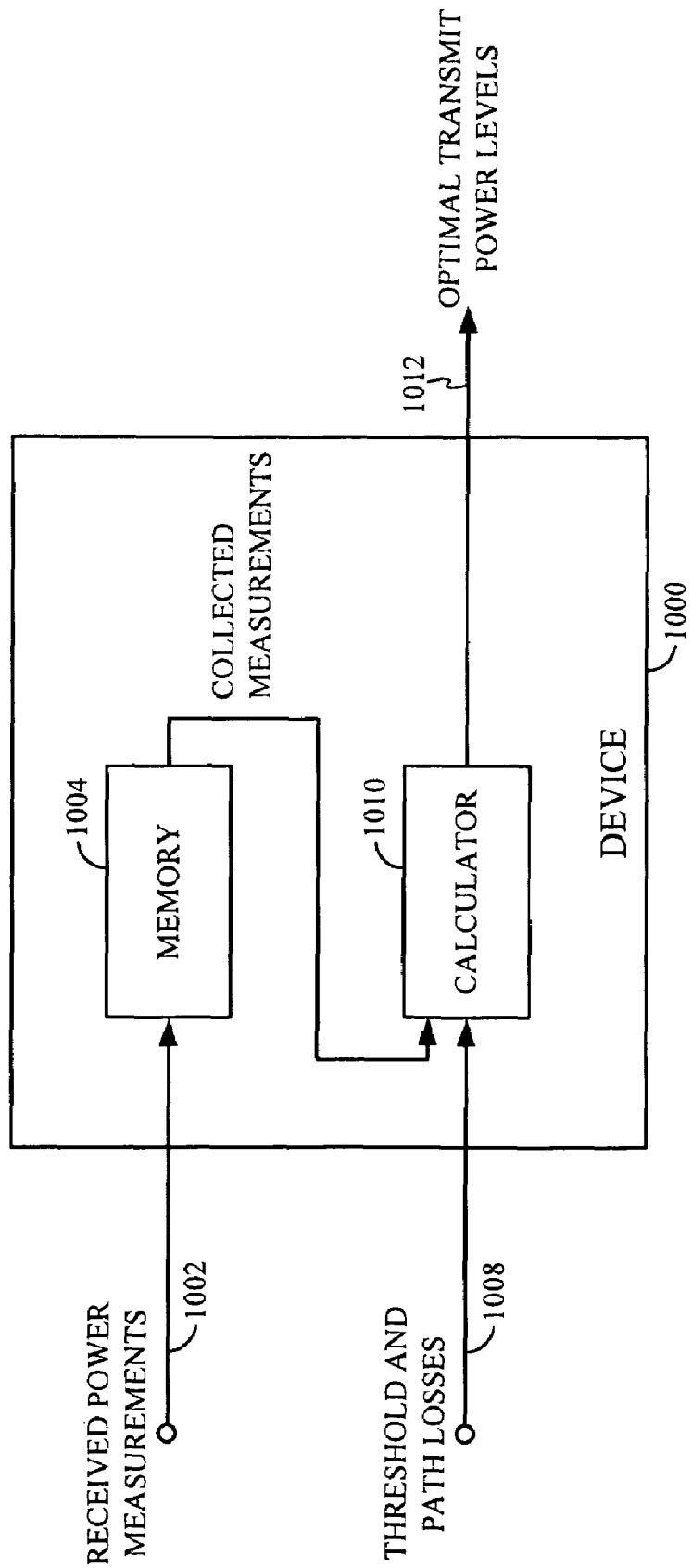
FIG. 10 is a schematic block diagram of a wireless communications power control processing device.

FIG. 10 is a schematic block diagram of a wireless communications power control processing device. The device 1000 comprises an interface on line 1002 for accepting received power measurements, and a memory 1004 for collecting the received power measurements. The device 1000 further comprises an interface on line 1006 for accepting a received power threshold values and path losses. A calculator 1008 generates optimal transmit power levels in response to the received power threshold values and path losses. The device also comprises an interface on line 1012 for supplying the optimal transmit power levels.

As noted in detail above, the calculator 1008 accepts received power threshold values in the form of a received power threshold matrix ($R_{th}$) and path loss in the form of a path loss matrix (L). The calculator generates a matrix ($P_{opt}$) of optimal transmit powers as follows:

$$P_{opt}=L_{inv}[R_{th}-N];$$

where $L_{inv}$ in the inverse of a matrix representing link path loss (L), and N represents receiver thermal noise.

A system and method have been presented for global power control in a wireless communications network. Examples of CDMA, UMTS, and ad-hoc networks have been given to illustrate the invention. However, the invention is not limited to any particular network protocol. An example was given of a particular mechanism for determining uplink and downlink path loss in a CDMA network. However, the system is not limited to any particular algorithm for determining the path loss. Other variations and embodiments of the invention will occur to those skilled in the art.

I claim:

1. In a Code Division Multiple Access (CDMA) telephone network, a method for global uplink power control, the method comprising:

providing an uplink path loss matrix ($L_u$) between User Equipment (UE) and Node-B devices;

selecting a Node-B received power threshold matrix ($Rb_{th}$); and generating a matrix ($Pm_{opt}$) of optimal transmit powers for UEs as follows:

$$Pm_{opt}=L_{uinv}[Rb_{th}-Nb];$$

where $L_{uinv}$ in the inverse of the matrix $L_u$; and where Nb is a matrix representing the thermal noise of Node-B receivers.

2. In a Code Division Multiple Access (CDMA) telephone network, a method for global downlink power control, the method comprising:

providing a downlink path loss matrix ($L_d$) between Node-B and User Equipment (UE) devices;

selecting a UE received power threshold matrix ($Rm_{th}$); and generating a matrix ($Pb_{opt}$) of optimal transmit powers for Node-Bs as follows:

$$Pb_{opt}=L_{dinv}[Rm_{th}-Nm];$$

where Nm is a matrix representing the thermal noise of UE receivers; and where $L_{dinv}$ in the inverse of the matrix $L_d$.

3. In a Code Division Multiple Access (CDMA) telephone network, an apparatus for global uplink power control, comprising:

Node-B devices, each Node-B device having a measurement circuit for measuring the received power;

User Equipment (UE) devices, each UE having an air interface for transmitting to the Node-B devices;

a controller having an interface connected to the Node-B devices, the controller using an uplink path loss matrix ($L_u$) between UE and Node-B devices, and a Node-B received power threshold matrix ($Rb_{th}$) to generate a matrix ($Pm_{opt}$) of optimal transmit powers for UEs as follows:

$$Pm_{opt}=L_{uinv}[Rb_{th}-Nb];$$

where $L_{uinv}$ in the inverse of the matrix $L_u$; and where Nb is a matrix representing the thermal noise of Node-B receivers; and wherein the UEs transmit at the optimum power levels in response to instructions from the link controller.

4. In a Code Division Multiple Access (CDMA) telephone network, an apparatus for global downlink power control, comprising:
- User Equipment (UE) devices, each UE having a measurement circuit for measuring received power;
- Node-B devices, each Node-B device having an air interface for transmitting to the UEs;
- a controller having an interface connected to the Node-B devices, the controller using a downlink path loss matrix ($L_d$) between Node-B and UE devices, and a UE received power threshold matrix ($Rm_{th}$) to generate a matrix ($Pb_{opt}$) of optimal transmit powers for Node-Bs as follows:

$$Pb_{opt} = L_{dinv}[Rm_{th} - Nm];$$

where Nm is a matrix representing the thermal noise of UE receivers;

where $L_{dinv}$ in the inverse of the matrix $L_d$; and wherein the Node-B devices transmit at the optimum power levels in response to instructions from the link controller.

5. In a Code Division Multiple Access (CDMA) telephone network, a device for global uplink power control, comprising:
- means for providing an uplink path loss matrix ($L_u$) between User Equipment (UE) and Node-B devices;
- means for selecting a Node-B received power threshold matrix ($Rb_{th}$); and
- means for generating a matrix ($Pm_{opt}$) of optimal transmit powers for UEs as follows:

$$Pm_{opt} = L_{uinv}[Rb_{th} - Nb];$$

where $L_{uinv}$ in the inverse of the matrix $L_u$; and where Nb is a matrix representing the thermal noise of Node-B receivers.

6. In a Code Division Multiple Access (CDMA) telephone network, a device for global downlink power control, comprising:
- means for providing a downlink path loss matrix ($L_d$) between Node-B and User Equipment (UE) devices;
- means for selecting a UE received power threshold matrix ($Rm_{th}$); and
- means for generating a matrix ($Pb_{opt}$) of optimal transmit powers for Node-Bs as follows:

$$Pb_{opt} = L_{dinv}[Rm_{th} - Nm];$$

where Nm is a matrix representing the thermal noise of UE receivers; and where $L_{dinv}$ in the inverse of the matrix $L_d$.

7. In a Code Division Multiple Access (CDMA) telephone network, an integrated circuit for global uplink power control, comprising:
- a processor operable to:
- provide an uplink path loss matrix ($L_u$) between User Equipment (UE) and Node-B devices;
- select a Node-B received power threshold matrix ($Rb_{th}$); and
- generate a matrix ($Pm_{opt}$) of optimal transmit powers for UEs as follows:

$$Pm_{opt} = L_{uinv}[Rb_{th} - Nb];$$

where $L_{uinv}$ in the inverse of the matrix $L_u$; and where Nb is a matrix representing the thermal noise of Node-B receivers.

8. In a Code Division Multiple Access (CDMA) telephone network, an integrated circuit for global downlink power control, comprising:
- a processor operable to:
- provide a downlink path loss matrix ($L_d$) between Node-B and User Equipment (UE) devices;
- select a UE received power threshold matrix ($Rm_{th}$); and
- generate a matrix ($Pb_{opt}$) of optimal transmit powers for Node-Bs as follows:

$$Pb_{opt} = L_{dinv}[Rm_{th} - Nm];$$

where Nm is a matrix representing the thermal noise of UE receivers; and where $L_{dinv}$ in the inverse of the matrix $L_d$.

* * * * *